(12) United States Patent
Houghton (10) Patent No.: US 7,727,087 B2
(45) Date of Patent: Jun. 1, 2010

(54) METHOD FOR CONDUCTING BUSINESS ON THE GOLF COURSE INCORPORATING THE USE OF GOLF BALL MARKERS

(76) Inventor: Karen Houghton, 1702 Juniper Dr., Merritt, British Columbia (CA) V1K 1J6

( * ) Notice: Subject to any disclaimer, the term of this patent is extended or adjusted under 35 U.S.C. 154(b) by 292 days.

(21) Appl. No.: 11/798,998

(22) Filed: May 18, 2007

(65) Prior Publication Data

US 2008/0287220 A1 Nov. 20, 2008

(51) Int. Cl.
*A63B 57/00* (2006.01)
(52) U.S. Cl. ...................................... 473/409; 473/406
(58) Field of Classification Search ................ 473/406, 473/408, 409, 405, 404, 351, 353, 285, 286; D21/794

See application file for complete search history.

(56) References Cited

U.S. PATENT DOCUMENTS

| | | | |
|---|---|---|---|
| 3,041,071 A | 6/1962 | Fialon | |
| 3,208,123 A | 9/1965 | Koos | |
| 3,847,110 A | 11/1974 | Inoue | |
| D233,897 S | 12/1974 | Hart | |
| 3,866,749 A | 2/1975 | Stainer | |
| 3,895,797 A | 7/1975 | Moore | |
| 3,938,805 A | 2/1976 | Sakuma | |
| 4,130,950 A | 12/1978 | Bazzle et al. | |
| 4,489,444 A | 12/1984 | Graham | |
| 4,639,947 A | 2/1987 | Lanscioni | |
| 4,672,718 A | 6/1987 | Schlueter et al. | |
| 4,858,925 A | 8/1989 | DeStefano, Jr. | |
| 4,979,833 A * | 12/1990 | Cook | 383/12 |
| D319,862 S | 9/1991 | Lahger | |
| 5,135,220 A | 8/1992 | Baldoni | |
| 5,282,616 A | 2/1994 | Stacavich-Notaro | |
| D350,178 S | 8/1994 | Kristovich | |
| 5,364,094 A | 11/1994 | Mustion | |
| 5,529,299 A * | 6/1996 | Bellagamba | 473/285 |
| D372,882 S | 8/1996 | Goldman et al. | |
| 5,569,103 A | 10/1996 | Sihn | |
| 5,813,084 A * | 9/1998 | Hadaway | 473/406 |
| 5,898,946 A | 5/1999 | Keating et al. | |
| D411,276 S | 6/1999 | Rosenfeld | |
| 5,996,116 A | 12/1999 | Tate | |
| 6,077,174 A | 6/2000 | Noritake | |
| 6,163,889 A | 12/2000 | Tate | |
| D437,020 S | 1/2001 | Streit | |
| D456,476 S | 4/2002 | Tate | |
| 6,386,995 B1 * | 5/2002 | Jastram | 473/406 |
| 6,422,955 B1 | 7/2002 | Lopez | |

(Continued)

*Primary Examiner*—Steven Wong
(74) *Attorney, Agent, or Firm*—Antony C. Edwards (57) ABSTRACT

A method of promoting business on a golf course using golf ball position markers including the steps of: providing replacement golf ball markers mountable on golf gloves, the markers having a corporate theme or logo to be promoted conveyed on the top side of each marker; distributing the markers to golfers and substituting the markers for non-promotion markers which do not convey the corporate theme or logo, so as to promote the corporate theme or logo to the golfers during play, whereby as consecutive golfers from a group of the golfers putt on each green in the series of greens comprising the golf course being played, the corporate theme or logo is recurringly conveyed to the group each time various markers in random order are used during putting on the greens.

8 Claims, 5 Drawing Sheets

U.S. PATENT DOCUMENTS

| | | |
|---|---|---|
| D462,102 S | 8/2002 | Urbik |
| 6,457,184 B1 | 10/2002 | Adams |
| 6,513,165 B1 | 2/2003 | England et al. |
| 6,519,776 B1 | 2/2003 | Davenport et al. |
| D472,290 S * | 3/2003 | Kristoffersen ............. D21/794 |
| 6,547,682 B1 | 4/2003 | Goodwin |
| 6,553,575 B1 | 4/2003 | Davenport et al. |
| 6,569,039 B1 | 5/2003 | Cope |
| 6,578,746 B1 | 6/2003 | Greves |
| D480,444 S | 10/2003 | Marchessault et al. |
| 6,658,813 B2 * | 12/2003 | Clay ............................ 53/155 |
| 6,688,505 B1 | 2/2004 | Bradley et al. |
| 6,820,282 B1 | 11/2004 | England et al. |
| 6,966,851 B1 | 11/2005 | England et al. |
| 6,984,183 B2 | 1/2006 | Cope |
| D517,149 S | 3/2006 | Shutter et al. |
| 2004/0254034 A1 | 12/2004 | Tymchyn |

* cited by examiner

METHOD FOR CONDUCTING BUSINESS ON THE GOLF COURSE INCORPORATING THE USE OF GOLF BALL MARKERS

FIELD OF THE INVENTION

The present invention relates generally to the golf industry and teaches a novel method for conducting business on the golf course incorporating the use of golf ball markers, and also relates to the markers themselves.

BACKGROUND OF THE INVENTION

The game of golf as it is known today originated from a game played on the eastern coast of Scotland during the 15$^{th}$ century. It was, and for centuries remained, a game of the affluent for it was they who had the means to afford the handcrafted equipment required to partake in the sport and the luxury of time in which to play. With the industrial revolution, however, came the large-scale production of metal club heads, shafts and balls and a consequent reduction in the cost to acquire same. The sport became accessible to the general populace and its popularity rapidly grew. [A History of Golf since 1497 at www.golfeurope.com/almanac/history/history3.htm]

As is described at Business Reference Services, Library of Congress [www.loc.gov/rr/business/BERA/issue3/golf.html+golf+industry+sale+stati . . . ], amateur participation in golf has been increasing in the United States since 1985. In 1985, approximately 17 million golfers in the United States played over 414 million rounds of golf at over 12,000 facilities. That number had increased to over 27 million golfers playing almost half a million rounds at almost 16,000 facilities by 2003. Revenues generated from the retail sale of golf related equipment such as bags, balls, etcetera were $2.5 billion in 1990 and by 2002, had climbed to over $3 billion.

As is evidenced by the above-referenced revenue statistics, the golf industry has become heavily commercialized. Product branding, through the placement of corporate logos on promotional golf accessories such as golf tees and balls which are intended to be given away, is commonplace.

In addition to its rapid growth in overall popularity, golf and, more specifically, the act of engaging in a game of golf with others has, in the commercial setting, evolved from mere recreation to a place for doing business. Jonathan B. Weinbach of The Wall Street Journal reported in his Jan. 11, 2000 article, "As golf continues its transformation from province of the wealthy to mass pastime, a growing number of major U.S. companies—including Marriott Corp., International Business Machines Corp. and Merrill Lynch & Co. Inc.—are sending young executives to "business golf" experts to learn the art of selling themselves on the fairway. The rationale: Rounds of golf are now the "martini lunches" of a generation ago, so companies need salespeople with social graces and tactical savvy on the links." [www.theglobeandmail.com/series/golf/business/20000111.html]

Golf is considered by networking experts to be one of the single most important activities for a business be it for negotiating deals, procuring new clients or expanding contacts. [Ottawa Business Journal, May 10, 2006 at www.ottawabusiness.com] It has become a useful tool for initiating contacts, acting as an ice-breaker. With golf forming a common bond of interest between two or more individuals, a basis upon which a business relationship can develop is thereby created and fostered. The hours spent together on the links allows players to acquaint themselves with the personal likes, dislikes, interests and histories of their fellow players, which information may prove useful in future dealings, as well as providing the players with an opportunity to form assessments of their golfing partners.

Golf has a well-established reputation as being a game of etiquette and finesse. The manner in which a player conducts himself on the golf course can communicate much to those with whom he is golfing. When those individuals are prospective clients, business partners or referral sources, they may during the course of the round learn about that player's attitudes, approach to business, and to life. Not surprisingly, golf etiquette, a skill which is said to be learned, practiced and respected, has been likened to the customs practiced in business. [www.GolfIncline.com]

One such rule of etiquette involves the procedure to be followed when putting on the green. As is described in U.S. Pat. No. 5,569,103, it is a practice in the game of golf to allow a player whose ball lies farthest from the hole on the green to putt first. As another player's ball may lie on or close to the anticipated path of the furthest ball, the rules of the game allow for the closer player to mark the location of his or her ball temporarily with a marker which will not impede the travel of another ball if that other ball passes over the marker. Many players place a dime or other small, flat object such as a button at the location of the temporarily removed ball to mark its location until the ball is returned to play. The golfing industry has developed a number of specialized markers for such use.

One such specialized marker is a marker which is removably mounted to a golf glove. As is described in U.S. Pat. No. 6,519,776, a number of years ago, golf glove manufacturers began to sell gloves which had a removable ball marker attached by means of a "snap" connector to each glove. The glove is equipped with a female receptacle or socket, and the marker has a corresponding male fitting or stud on its back.

Such snap-on ball markers, when sold with the corresponding glove, commonly bear the logo or insignia of the golf glove manufacturer. The appearance of such brands on snap-on ball markers is, for the most part, commonplace in the golfing industry and, consequently, unremarkable. Such non-distinctiveness may prove to be problematic where two or more players in a golfing party are wearing gloves made by the same manufacturer, each of which gloves are fitted with markers bearing that manufacturer's logo. The problem may be compounded if the players all belong to the same golf club and hence likely shop for gloves in the same pro shop, thus ending up with the same brands of gloves and, consequently, identical markers. If two or more of these players have occasion to use their matching ball markers on the green at the same time, it may become difficult for them to determine which marker was placed where by which player which could result in an awkward situation for the subject golfers. Hence, should one such player be seeking to curry favour with his carefully selected golfing partners, the player may find himself at a decided disadvantage. Rather than delivering a well-rehearsed, smooth and polished business presentation and showing a commensurate command of the game of golf as planned, the player, because of the confusion resulting from the use of identical, nondescript ball markers, may suddenly find himself or herself not entirely in control of the game and perhaps, at worst, flustered and embarrassed in front of those the player wants to impress.

In addition, as is described in U.S. Pat. No. 4,639,947, the markers designed for attachment to golf gloves are usually small and, in many instances, may be left on the green unintentionally or dropped prior to being replaced into the glove receptacle thereby becoming separated from the glove indefinitely. Applicant is also aware of U.S. Pat. No. 5,569,103, issued to Sihn on Oct. 29, 1996 which describes a Golf Ball Marker preferably formed entirely of a precious metal, such as ten to eighteen karat gold, and may include one or more settings precious stones on the upper surface thereof. Alternatively, Sihn teaches that the marker may be formed primarily of a less costly base metal and plated with a precious metal, as desired, or that the upper periphery of the marker preferably includes a plurality of facets therearound, with the precious metal and stones and the faceted edged providing a brilliant and highly reflective marker from virtually any angle or position. Sihn describes that the substantially spherical protrusion extending from the bottom surface serves to secure the marker on the green, and also serves to secure the marker to an article of apparel as an ornamental jewelry articles when not in use as a ball marker.

The loss of snap-on ball markers is a common occurrence which results in the glove owner being left with a golf glove which has no snap-on ball marker, only a female receptacle looking for a mate. This loss, in turn, means that the player, who may by now be in the middle of an important golf game with prospective clients or a prospective employer whom the player wishes to impress, must now seek alternative means for marking the location of his golf ball on the green, such as fumbling through pockets looking for loose change. This, of course, defeats one of the primary reasons which motivated the player to purchase the golf glove in the first place, namely, to convey, by having a readily accessible ball marker to hand, an air of preparedness and mastery of the situation. Such unseemly fumbling, however, may have an opposite impact upon the individuals with whom the player is golfing, and is endeavouring to impress.

The failure to have made provision for the loss of the snap-on marker, which is a reasonably foreseeable event, may be considered by these golfing partners to reflect poorly on the player's perceived aptitude for planning for contingencies, including then by inference, those in business. That is, the golfer's fellow players may, for example, consider such an incident to be indicative of a failure to anticipate and to make appropriate provision to avoid such perceived failures, the antipodal message to that which the golfer was intending to convey. For the fellow players, who are not only playing a round of golf but are also assessing the business acumen, poise and finesse of their fellow golfer as a prospective supplier, partner or other business associate or employee, such lack of preparedness may, in their minds, have a significant negative impact on their assessment of the golfer's candidacy for the subject project or position.

SUMMARY OF THE INVENTION

In summary, the method of conducting business on a golf course using golf ball position markers according to one aspect of the present invention may be characterized as including the steps of:
 a) a user such as a business person providing a set of replacement golf ball markers mountable by snap fasteners on golf gloves, wherein the set of markers have a common theme conveyed by the set taken together as a group of markers and wherein each marker of the set conveys different element of the theme;
 b) distributing at least one marker from the set markers to each golfer in a group of golfers golfing together, wherein advantageously the group of golfers includes the business person, so as to randomly convey the elements of the theme to the group of golfers so that each of the golfers using the distributed markers during play to mark a golf ball position on a putting green conveys an element of the elements of the theme from each marker as each marker is used, typically by placing a golf-glove mounting side of the marker downwards onto the green so as to dispose upwardly a theme side of the marker having the element opposite the mounting side;
 whereby as consecutive golfers in the group of golfers putt on each green in the series of greens comprising the golf course being played, the theme is recurringly conveyed as recurring elements of the theme are conveyed to the group each time various markers in random order from the set are used during putting on the greens.

For example the theme may be a corporate theme or logo for advertising of wares or services promoted by the business person for example the offering of property or investments for sale. Alternatively the themes may be, without intending to be limiting:
 a) instructing the group of golfers on how to improve the group's golfing technique, and wherein the business person may be a golf instructor;
 b) a relaxation theme for promoting the relaxation of the group of golfers; or
 c) a motivation theme for promoting the motivation of the group of golfers.

Each marker may be provided with a signalling means chosen from the group comprising: a light emitting device, a sound emitting device, or a RF signal emitting device, in which case the method includes the step of conveying the theme to the golfers by the signalling means.

DETAILED DESCRIPTION OF EMBODIMENTS OF THE INVENTION

Consequently, in order to assist such a golfer in avoiding failure, the present invention includes in one aspect providing replacement snap-on markers which are sized to fit the female ball marker receptacles with which commercially available golf gloves are commonly equipped thereby enhancing the utility, affordability and replaceability of such snap-on markers and of the gloves in association with which such replacement markers are used. Having replacement snap-on ball markers of the present invention at the golfer's disposal may assist a golfer who finds himself in situations such as those outlined above. That is, the golfer may thereby be able to avoid the potentially detrimental consequences which may flow from the use of a generic ball marker of the type which are sold as part of and are removably attached to a golf glove, or as may flow from that golfer's discovery that his ball marker, which he thought was attached to the glove, is missing.

The present invention includes in another aspect a replacement ball marker which is adapted to fit the female snap-on ball marker receptacles commonly incorporated into and forming part of golf gloves. Such replacement snap-on ball markers may be manufactured and sold independently of the sale of conventional golf gloves and may thereby function to replace original, or subsequent replacement, as the case may be, the male golf glove snap-on markers, when such original or replacement, snap-on markers have been lost. The availability of such replacement markers will enable golfers to take full advantage of golf gloves which are fitted with female receptacles for mating with the male snap-on golf glove markers even when, as is often the case, the original marker is lost.

Such replacement markers may have bodies created in various shapes including disc-shaped, such as, without intending to be limiting, flower-like, geometric or other distinctive shapes. The replacement markers of the present invention may also include written or pictorial representations on the surfaces thereof and could, for example, without intending to be limiting, depict corporate logos thereby enabling their use as promotional items, or bear cartoon characters intended to capture and hold the interest of junior golfers. The replacement ball markers of the present invention may also be created in a size which is larger than those which are commonly sold as part of a golf glove so as to assist golfers who have difficulties with their vision. If the replacement ball marker is oversized, for example, it may be easier for such a golfer to see the marker while it is on the glove, thereby assisting the golfer in removal of the marker from the glove, and to thereafter retrieve the marker from the golf green once it is no longer required.

Figure 1:
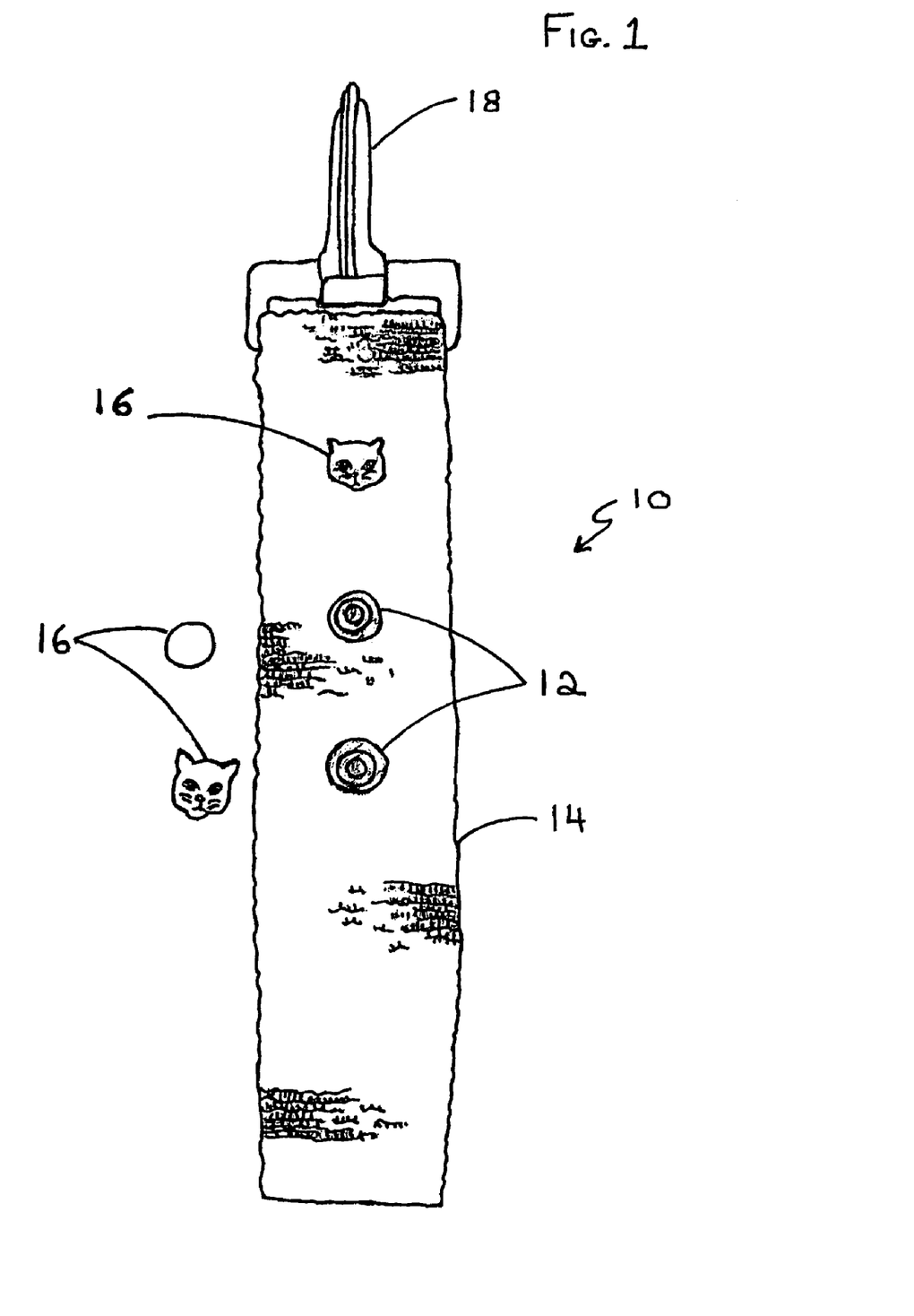
FIG. 1 is, in plan view, the storage unit for the replacement markers according to one aspect of the present invention.
Figure 1A:
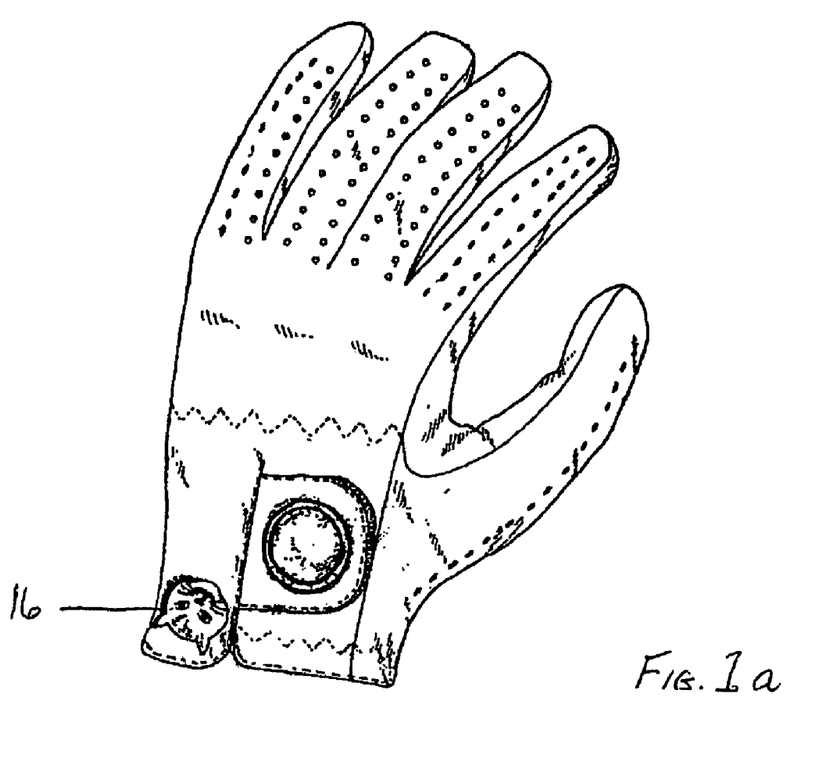
FIG. 1a is, in perspective view, a prior art golf glove with a marker mounted on the glove adjacent the wrist closure fastener.

In yet a further aspect as illustrated in FIG. 1, the present invention provides a storage unit 10 for the replacement markers. In one embodiment of the present invention, a number of female snap receptacles 12 are placed on a flexible receptacle sheet 14 made of a suitable material such as, without intending to be limiting, nylon webbing or heavy canvas. A corresponding number of replacement markers 16 are then removably attached to the female snap receptacles 12 on the flexible receptacle sheet 14. Hence, when a replacement marker 16 is required, the golfer can remove a replacement marker 16 from the receptacle sheet 14 and attach it to the golfer's golf glove as seen in FIG. 1a. The marker receptacle sheet 14 may, in an alternative embodiment, as illustrated in FIG. 1, be equipped with a suitable means for attaching the receptacle to a golf bag or golf cart such as, without intending to be limiting, a clip assembly 18. Utilization of such attachment means may further enhance for the golfer the accessibility of the replacement markers. In addition, for golfers who are either not wearing gloves or are wearing gloves which are not equipped with a golf marker assembly, the marker receptacle sheet may also function to provide such golfers with conveniently available ball markers.

Golf is increasingly being recognized as a useful and effective business tool. Success in the business world is not dictated merely by what one knows. For the businessperson it is, to a significant degree, dictated by who one knows and the relationship which that businessperson has with such individuals. A game of golf can be used to forge new associations or to strengthen existing relationships. Fortunes can be made, or lost, in what appears on its face to be nothing more than an innocent round of golf.

Figure 2:
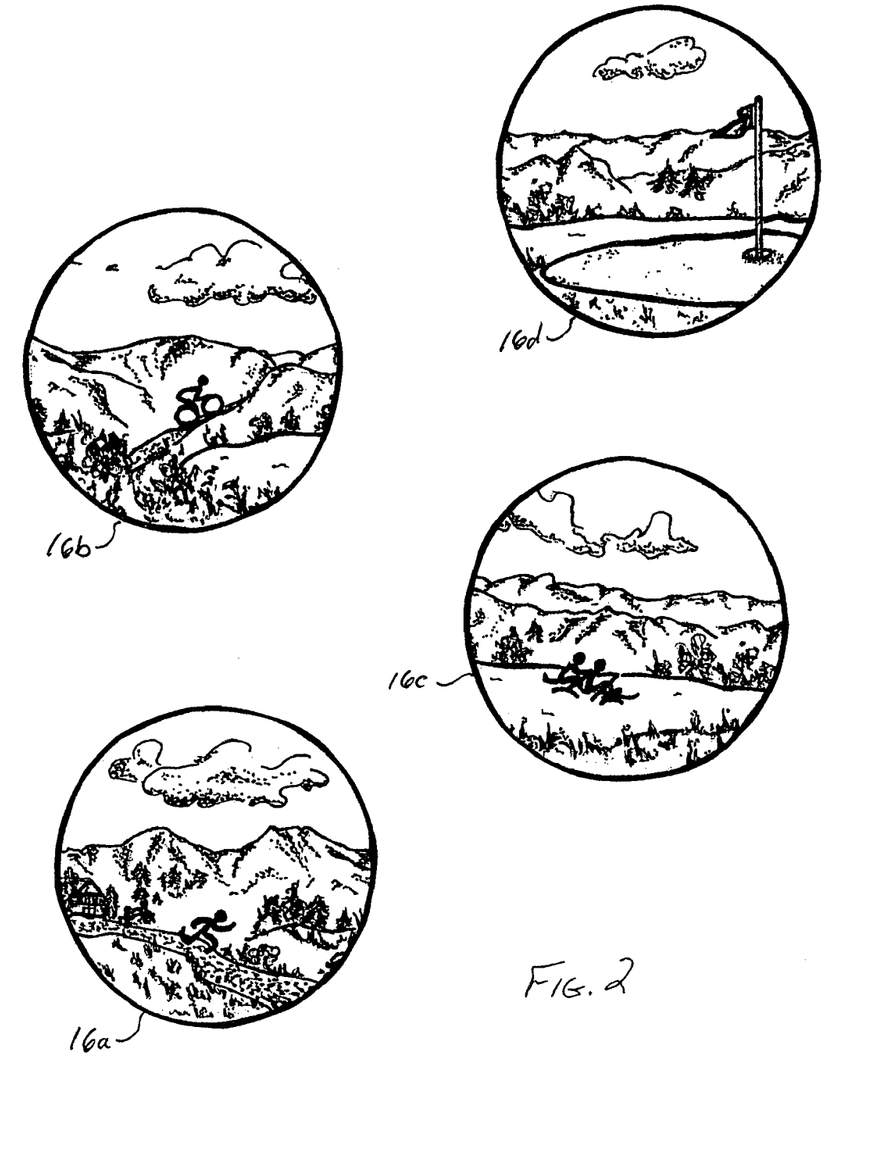
FIG. 2 is, in plan view, a set of four of the replacement ball markers of the present invention.
Figure 2A:
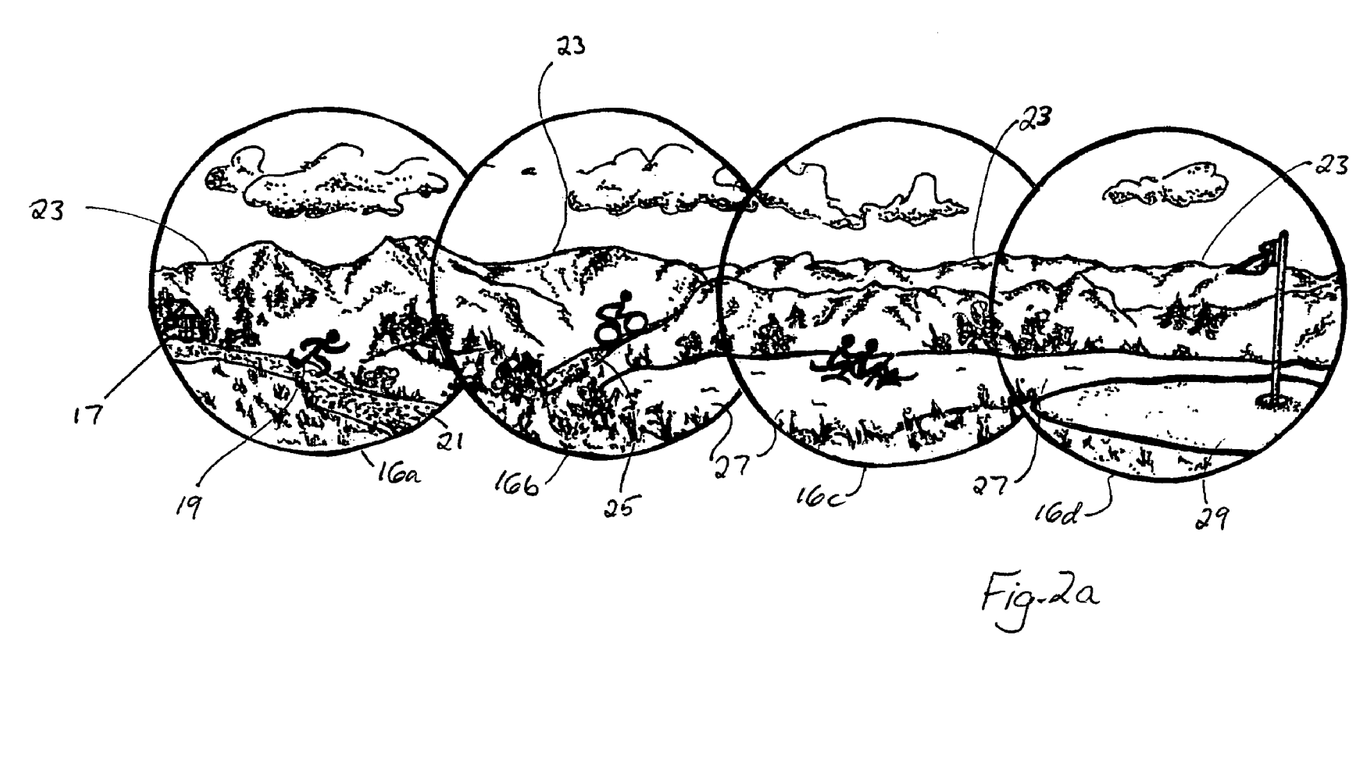
FIG. 2a is, in plan view, the set of markers of FIG. 2 side-by-side and overlapped to convey in one continuous panoramic the theme of the set.

How then can the replacement ball markers and method of the present invention be used to further business? To give one example, a sophisticated developer seeking investors for an upcoming project can, by means of the present business method utilizing replacement ball markers not only avoid the potentially embarrassing situations noted above but also secure an advantage in the marketplace. As the players approach the first tee, the developer can casually distribute to each of his playing partners distinctive markers. For example, each marker may be different in colour or content to its counterparts and each may bear a different element of the theme of the developer's upcoming project or merely the developer's trademark. To give a more detailed example, as illustrated in FIG. 2, a set of four markers may demonstrate the elements of a golf destination resort being promoted by a developer. One replacement marker 16a in the set may demonstrate that chalets 17 are present and by inference available for sale or rental and that a visitor 19 is invited to go running or jogging on running paths 21 against the backdrop of the mountain panorama 23. A second marker 16b of the set may demonstrate by interlocking the mountain panorama 23, that at the same resort the visitor is also invited to go mountain-biking on biking trails 25. Similarly, the third marker 16c of the set may demonstrate by interlocking panorama 23 that at the same resort the visitor is also invited to go canoeing on lake 27. And finally, the fourth marker 16d of the set may demonstrate by interlocking the panorama 23 and the lake 27 that at the same resort the visitor is also invited to, of course, go golfing on golfing greens 29, the inference being that a complete golf course is available at the resort. Thus, when used individually in play, the four markers 16a-16d, to use this example, are repetitively put down on a putting green and eventually convey their interlocking theme to the group of players. Being the consummate promoter, the developer is undaunted when one of his fellow golfers indicates that the marker does not fit that player's glove as the developer has come prepared. The developer has provided a storage receptacle mounted in the golf cart or has arranged for each of the markers to be made in sizes compatible with the sizes of female receptacles commonly used on golf gloves to attach snap-on markers. He simply exchanges the marker with a replacement of the appropriate size and looks so very well prepared.

Consequently, the developer has with this innovative method of doing business, which includes the use of cleverly designed replacement ball markers of the present invention, piqued the curiosity of his golf, and potential business, partners in his upcoming development project. He has also, in a memorable and distinctive fashion, laid the foundation upon which his description of his project will be built. The effort which has gone into creating the markers and the act of distributing the same, including having a storage receptacle or the same available in more than one size, will also function to convey to his golfing counterparts not only that he is a sophisticated businessman who is committed to his project but also that he is a well-organized individual who gives careful forethought to the future. The mere act of giving these small gifts to his fellow players also suggests to these individuals that they are held in high regard, thereby engendering feelings of good humor and amity within the group. It is a gift which joins them together. Whether or not this foursome ultimately decides to embark upon a business venture together, they are, for next five and one-half hours, part of a distinctive team. And when the players leave the last green they will take with them not merely a business card, but a carefully crafted reminder of the developer, the developer's business acumen, and the developer's project.

In an alternative embodiment of the present business method, the replacement ball markers may be used as educational tools. As part of a lesson program for example, a golf instructor will often identify areas of difficulty for individual students. These areas of difficulty, such as failing to follow through on a swing or lifting one's head, are often shared by other students of the game. To assist the students in improving their respective golfing skills and thereby enhancing their enjoyment of the sport, the instructor may distribute to the students replacement ball markers according to the present invention inscribed with teaching aids such as, without intending to be limiting, "KEEP HEAD DOWN" or "FOLLOW THROUGH". Then, when the student places the marker on the green, the student will be provided with a timely reminder to not look during swinging or to complete the swing, as the case may be. The markers may also indicate levels of skill achieved by the students or by other golfers, and so may indicate achievements such as "300 yards" or "I Drive [insert name of expensive car]"

In a further embodiment of the present invention, motivational or inspirational messages may be inscribed on replacement ball markers. Without intending to be limiting, such messages may provide health benefits to the golfer by reminding the golfer that the primary reason for being out on the course is to restore balance to the golfer's life and to reduce stress and may include, for example, messages such as "CELL PHONE OFF" or "ENJOY" or "SERENE" or "BE HAPPY". For the more superstitious at heart, the replacement ball markers of the present invention may, for example, bear a personalized good luck charm or talisman. And, for the goal-oriented golfer, the replacement ball marker of the present invention may say "CHOCOLATE" or "HOME" as a reminder of the reward or rewards which await the golfer thereby providing an on-going incentive to persevere and complete the round.

Figure 3:
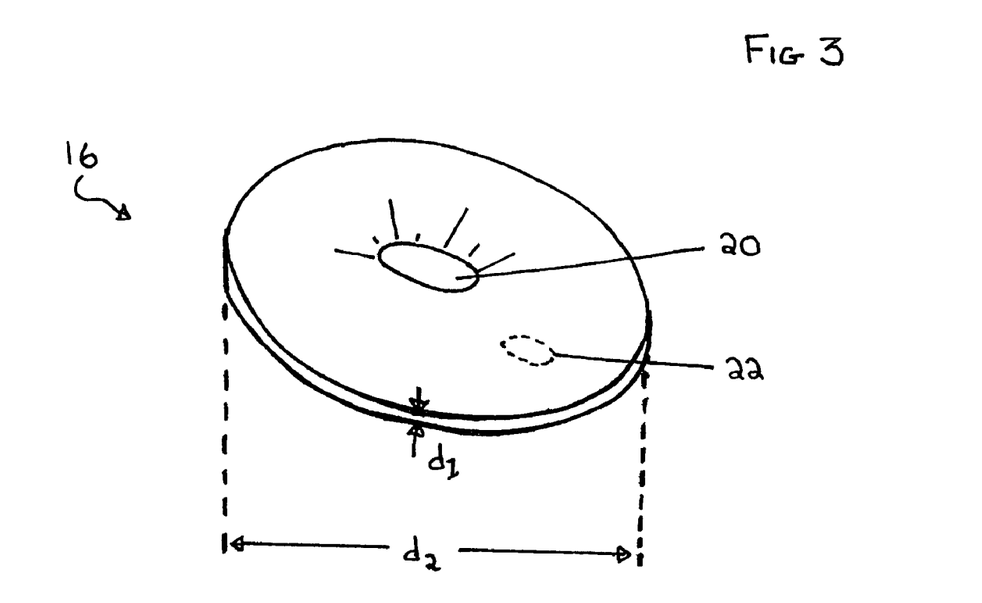
FIG. 3 is, in perspective view, the replacement marker according to one embodiment of the present invention.

In yet a further embodiment, marker 16 may include a signaling means such as, for example, a light emitting device such as light emitting diode 20 and battery 22 (dotted outline) as seen in FIG. 3, or such other light and power source which is small enough to fit into a typical marker 16, such as, for example, a marker having approximate dimensions of 3 mm in thickness ($d_1$) and 1 cm in width ($d_2$). The light source may be activated by various activating or triggering means such as, for example, remote activation including activation by sound (whistle, clap, tap-foot in close proximity), by vibration (tap foot in close proximity), by touch or pressure (squeezing the marker or stepping on the marker), by heat (hand warming), by chemical reaction (for example such as used in chemical light wands which light upon a chemical reaction within), or by a manual on/off switch. The light emitting device may light continuously or flash regularly or intermittently, and may automatically shut off after a predetermined time, for example ten to sixty seconds. In other embodiments, the marker's signaling means includes a processor and speaker (not shown) to emit sound and/or light, or the signaling means includes a processor and antenna, etc. (not shown) to emit a radio-frequency (RF) signal and/or light or sound, the RF signal sending a text or other message or video or business card, etcetera to the user's cell phone, personal digital assistant (pda) as currently manufactured by Research in Motion™ and sold under the trade-name Blackberry™, or the like.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of conducting business on a golf course using golf ball position markers, the method comprising the steps of:

a business person providing a set of replacement golf ball markers mountable on golf gloves, said set of markers having a common theme conveyed by said set taken as a group of markers together and each marker of said set conveying different element of said theme, distributing at least one marker of said set of markers to each golfer of a group of golfers golfing together wherein said group of golfers includes the business person, so as to randomly convey said elements of said theme to said group of golfers so that each of said golfers using said distributed markers during play to mark a golf ball position on a putting green conveys an element of said elements of said theme from each said marker as each said marker is used by placing a golf-glove mounting side of said marker downwards onto the green so as to dispose upwardly a theme side having said element opposite said mounting side, wherein said marker is provided with a signalling means chosen from the group consisting of:

a light emitting device, a sound emitting device, or a RF signal emitting device, and wherein said method includes the step of conveying said theme to said golfers by said signalling means, whereby as consecutive golfers in said group of golfers putt on each green in the series of greens comprising the golf course being played, said theme is recurringly conveyed as recurring elements of said theme are conveyed to said group each time various markers in random order from said set are used during putting on the greens.

2. The method of claim 1 wherein said theme is advertising of wares or services promoted by the business person.

3. The method of claim 1 wherein said theme is instructing the group of golfers on how to improve the group's golfing technique.

4. The method of claim 3 wherein said business person is a golf instructor.

5. The method of claim 1 wherein said theme is a relaxation theme for promoting the relaxation of the group of golfers.

6. The method of claim 1 where said theme is a motivation theme for promoting the motivation of the group of golfers.

7. The method of claim 2 wherein said wares or services include the offering of property or investments for sale.

8. A method of promoting business on a golf course using golf ball position markers, the method comprising the steps of:

providing replacement snap fastener golf ball markers mountable by snap fasteners on golf gloves, said markers having a corporate theme or logo to be promoted conveyed on the top side of each marker, distributing said markers to golfers and substituting said markers for non-promotion markers which do not convey said corporate theme or logo, including markers supplied with the golfer's golf glove, so as to promote said corporate theme or logo to said golfers during play, wherein said marker is provided with a signalling means chosen from the group consisting of:

a light emitting device, a sound emitting device, or a RF signal emitting device, and wherein said method includes the step of conveying said theme or logo to said golfers by said signalling means, whereby as consecutive golfers from a group of said golfers putt on each green in the series of greens comprising the golf course being played, said corporate theme or logo is recurringly conveyed to said group each time various markers in random order are used during putting on the greens.

* * * * *